H. A. MYERS.
ADJUSTABLE ANTIFRICTION BEARING.
APPLICATION FILED NOV. 13, 1911.
1,122,986.
Patented Dec. 29, 1914.
2 SHEETS—SHEET 1.
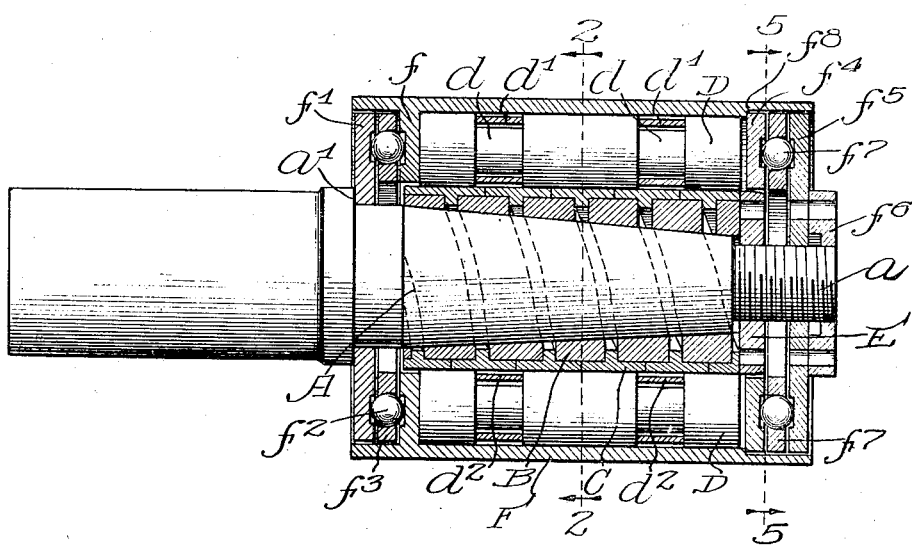
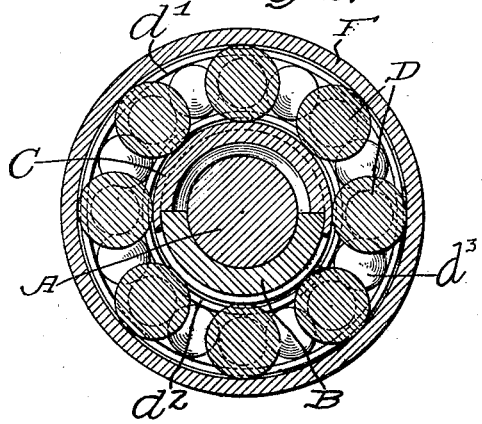
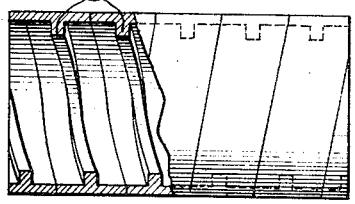
Witnesses:
Inventor:
Hubert A. Myers
By Arthur F. Durand
Attorney

H. A. MYERS.
ADJUSTABLE ANTIFRICTION BEARING.
APPLICATION FILED NOV. 13, 1911.

1,122,986.

Patented Dec. 29, 1914.
2 SHEETS—SHEET 2.

Witnesses:
G. W. Omarus Jr.
Geo. F. Schmidt

Inventor
Hubert A. Myers
By Arthur F. Durand
Attorney

UNITED STATES PATENT OFFICE.

HUBERT A. MYERS, OF GOSHEN, INDIANA, ASSIGNOR OF ONE-HALF TO ARTHUR S. HICKOK, OF TOLEDO, OHIO.

ADJUSTABLE ANTIFRICTION-BEARING.

1,122,986.  Specification of Letters Patent.  Patented Dec. 29, 1914.

Application filed November 13, 1911. Serial No. 660,133.

*To all whom it may concern:*

Be it known that I, HUBERT A. MYERS, a citizen of the United States of America, and resident of Goshen, Elkhart county, Indiana, have invented a certain new and useful Improvement in Adjustable Antifriction-Bearings, of which the following is a specification.

My invention relates to roller bearings in general, but more particularly to those having provisions for taking up wear, and in which means are provided for resisting the lateral thrust of the wheel hub, which provisions are important, for example, in the bearing of an automobile or truck wheel.

The principal object of my invention is to provide means for tightening a roller bearing to take up wear without causing a wedging action on the part of the rollers thereof.

It is also an object to provide a novel arrangement whereby the rollers of the bearing may all be parallel.

Another object is to provide a novel form of anti-friction thrust bearing for preventing lateral play of the wheel hub on the axle.

To these and other useful ends, my invention consists in matters hereinafter set forth and claimed.

Figure 4:
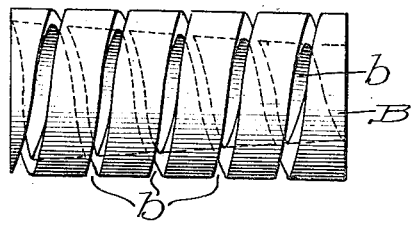
Figure 5:
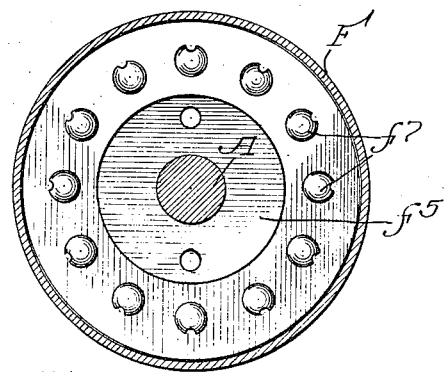
Figure 6:
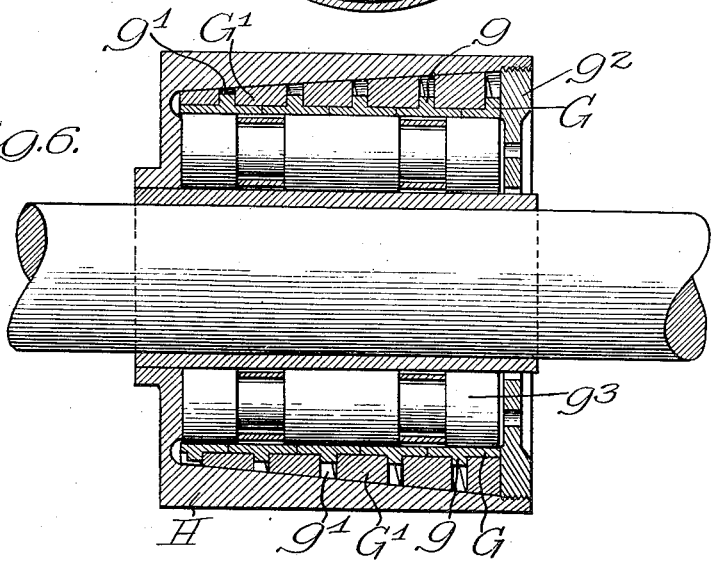

In the accompanying drawings—Figure 1 is a longitudinal section of a roller bearing embodying the principles of my invention. Fig. 2 is a transverse section on line 2—2 in Fig. 1. Fig. 3 is a side elevation of the wearing sleeve of said bearing. Fig. 4 is a side elevation of the adjusting or expanding sleeve which is inside of said wearing sleeve. Fig. 5 is a transverse section on line 5—5 in Fig. 1. Fig. 6 is a view similar to Fig. 1, showing a different form of my invention.

As thus illustrated, and referring to Figs. 1 to 5, inclusive, my invention comprises a tapered axle A having a reduced end portion $a$ which is threaded in the usual manner. A spiral adjusting or expanding spring or sleeve B is made tapering inside to receive the said tapered axle. This sleeve B provides a cylindric and practically smooth outer surface, except for the space $b$ between the convolutions thereof. The cylindric and spiral wearing sleeve C is formed internally with a spiral rib $c$ that engages the space $b$ in the inner sleeve. This sleeve C is made with its convolutions tight together, whereby a smooth and unbroken outer cylindric surface is formed. The anti-friction rolls D are arranged parallel and in position to roll around on the outer surface of the wearing sleeve C. Each roll has a pair of reduced portions $d$, and these form shoulders for the outer and inner retaining rings or bands $d'$ and $d^2$, whereby the rollers are held in place and against relative endwise displacement. The rollers are spaced apart by the small rollers $d^3$ that are interposed between the reduced portions $d$, and which roll around between the rings $d'$ and $d^2$, as shown more clearly in Fig. 2. The two sleeves B and C are held on by the nut E which is screwed upon the threaded portion $a$ of the axle. The hub of the wheel or outer sleeve F engages the rollers D and is supported thereby, thus providing an anti-friction action as the wheel rotates. This hub has an internal flange $f$, which is grooved, and a grooved ring $f'$ is forced on to the axle and against the shoulder $a'$ formed thereon. The anti-friction rolls $f^2$ are interposed between the flange $f$ and ring $f'$, and are held by the retaining ring $f^3$, whereby a thrust bearing is formed which takes the thrust of the hub in one direction. At the other or outer end of the hub a grooved ring $f^4$ encircles the nut E, and a grooved disk $f^5$ is held on the portion $a$ by a nut $f^6$. The anti-friction rolls $f^7$ are interposed between the rings $f^4$ and $f^5$, and are held in place by the retaining ring $f^7$, as shown more clearly in Fig. 5. Thus a thrust bearing is provided for the other end of the hub. The ring $f^4$ bears against a shoulder $f^8$ on the inner surface of the outer sleeve or hub.

When the bearing wears or becomes loose, all that is necessary is to tighten the nut E, as this expands the sleeves B and C, by reason of the taper of the axle, and keeps the rolls in firm contact with the sleeve C which is subject to wear. The thrust bearings are tightened by tightening the nut $f^6$. Thus wear is easily taken up.

In Fig. 6 the wearing sleeve G is the same as the sleeve C, except that it is practically turned inside out, whereby its outer spiral rib $g$ engages the spiral groove $g'$ in the outer adjusting sleeve G', which latter sleeve is spiral and tapering on the outside. The hub A is made with a taper bore to receive the sleeve G', and by tightening the nut $g^2$ the two spiral sleeves are crowded or forced inward and thus contracted upon the rollers $g^3$ of the bearing. In such case the rollers $g^3$ are arranged to travel on a cylindric sleeve $g^4$ on the shaft or axle. Any suitable means can be employed for preventing lateral displacement of the hub and counteracting the thrust.

The general diameter of the interior of the spring C is the same throughout its length, notwithstanding its interior spiral groove. This is also true of the spring G, as its general exterior diameter is the same throughout its length. Each spring consists of a single spiral coil having free ends. The convolutions are formed tight together, so that primarily the wearing surface is smooth and practically unbroken.

It is obvious that my improved roller bearing may be used for vehicle wheels, or other kinds of wheels, and for various purposes.

It is an important consideration of my invention that the convolutions of the spring C are primarily formed tight together. In other words, the adjustment of the bearing is not dependent upon space between the convolutions of the said spring, and hence the adjustment is always uniform—that is to say, the expansion of the spring will be uniform and of the same character from one end thereof to the other. It will also be seen that the adjustment is accomplished by a simple endwise movement of the said spring, without bodily rotation thereof, and by this I mean that the spring is not forcibly rotated about the axis of the bearing to produce the necessary endwise adjustment thereof. During the expansion of the said spring the convolutions thereof will, of course, move relative to each other, but there is no bodily rotation of the spring, as the axle nut E is not capable of communicating any rotary movement to the said spring. Thus, as stated, the slightest endwise adjustment of the spring will be accompanied by a uniform expansion from one end thereof to the other, which would not be the case were the spring formed with spaces between the convolutions thereof.

By reason of the construction employed, it will be seen that the helical spring C and also the helical spring B, have their convolutions held tight together by the tension thereof. The adjustable element E subjects the wearing sleeve to an endwise thrust or compression, and sustains the back thrust of the helical springs, at all times, thus serving the double function of adjusting the spring and holding it in an adjusted position against the tension thereof. This element E is not provided for rotating the helical wearing sleeve, but simply for exerting an endwise thrust thereof. The reaction of the two springs in an endwise direction, in their effort to regain the normal position thereof, is sustained at all times by the element E, and is thus resisted to keep the wearing sleeve in proper position.

What I claim as my invention is:

1. A roller bearing provided with rollers, a spiral adjusting sleeve mechanism mounted for relative endwise sliding adjustment for taking up wear, means for changing the diameter of the sleeve by bodily endwise movement thereof, means bearing against one end of the sleeve to produce said endwise adjustment, and means between which and said sleeve said rollers are interposed to reduce friction, said sleeve mechanism having a removable portion providing a wearing surface for said rollers, which portion is separate and distinct from said first mentioned means.

2. A roller bearing provided with rollers, and an adjustable wearing member therefor, said member comprising a spiral sleeve with the convolutions thereof in tight engagement with each other to provide an unbroken wearing surface, another coil spring forming a support for said sleeve, and means for changing the diameter of said sleeve to take up wear, said coil spring having a spiral groove, and said sleeve having a spiral rib engaging in said groove, with a flat seating surface between the convolutions of said rib.

3. A roller bearing provided with rollers, an adjustable device including a spiral sleeve with the convolutions thereof in tight engagement with each other, another coil spring forming a support for said sleeve, and means for changing the diameter of said sleeve to take up wear, said means comprising an element with a tapered surface fitting said device, and a member for causing relative longitudinal movement between said element and device to change the diameter of said sleeve, said coil spring having a spiral groove, and said sleeve having a spiral rib engaging in said groove, with a flat seating surface between the convolutions of said rib.

4. A roller bearing comprising rollers, a spiral coil spring providing a smooth cylindric wearing surface for said rollers to travel over, having the convolutions thereof formed tight together, whereby said convolutions engage each other continuously along a spiral line, a device having movement in the direction of the axis of said bearing, for forcibly moving said spring bodily endwise, by exerting pressure on one end thereof, and operative by the axial thrust thereof to keep the said convolutions in engagement with each other, and means whereby said endwise movement changes the diameter of the spring, the said spring having a spiral groove for said means.

5. A roller bearing comprising rollers, a spiral coil spring providing a smooth cylindric wearing surface for said rollers to travel over, having the convolutions thereof formed tight together, whereby said convolutions engage each other continuously along a spiral line, a device having movement in the direction of the axis of said bearing, for forcibly moving said spring bodily endwise, by exerting pressure on one end thereof and operative by the axial thrust thereof to keep the said convolutions in engagement with each other, and means whereby said endwise movement changes the diameter of the spring, the said spring having a spiral groove for said means, and the said spring having the same general diameter both externally and internally throughout the length thereof.

6. A roller bearing comprising rollers, a spiral coil spring providing a smooth cylindric wearing surface for said rollers to travel over, having the convolutions thereof formed tight together, whereby said convolutions engage each other continuously along a spiral line, a device having movement in the direction of the axis of said bearing, for forcibly moving the said spring bodily endwise, by exerting pressure on one end thereof and operative by the axial thrust thereof to keep the said convolutions in engagement with each other, and means whereby said endwise movement changes the diameter of the spring, the said spring having a spiral groove for said means, and said spring consisting of a single spiral coil having free ends.

7. A roller bearing comprising rollers, a spiral coil spring providing a smooth cylindric wearing surface for said rollers to travel over, having the convolutions thereof formed tight together, whereby said convolutions engage each other continuously along a spiral line, a device having movement in the direction of the axis of said bearing, for forcibly moving the said spring bodily endwise, by exerting pressure on one end thereof and operative by the axial thrust thereof to keep the said convolutions in engagement with each other, and means whereby said endwise movement changes the diameter of the spring, the said spring having a spiral groove for engagement with an element of said means, and said means also including a member of fixed form and length for exerting a wedging action when the said spring is moved endwise.

8. A bearing comprising a spiral coil spring providing a smooth cylindrical wearing surface, having the convolutions thereof formed tight together, whereby said convolutions engage each other continuously along a spiral line, means engaging said surface, having motion thereon about the axis of the bearing, a device having movement in the direction of the axis of said bearing, for forcibly moving the said spring bodily endwise, by exerting pressure on one end thereof and operated by the axial thrust thereof to keep the said convolutions in engagement with each other, whereby each convolution pushes the next one ahead by direct lateral contact therewith, and means whereby said endwise movement changes the diameter of the spring, the said spring having a spiral groove for said last mentioned means.

9. A bearing comprising a spiral coil spring providing a smooth cylindric wearing surface, having the convolutions thereof formed tight together, whereby said convolutions engage each other continuously along a spiral line, means engaging said surface, having motion thereon about the axis of the bearing, a device having movement in the direction of the axis of said bearing, for forcibly moving the said spring bodily endwise, by exerting pressure on one end thereof, adapted for keeping the said convolutions in engagement with each other, whereby each convolution pushes the next one ahead by direct lateral contact therewith, and means whereby said endwise movement changes the diameter of the spring, the said spring having a spiral groove for said last mentioned means, said spring consisting of a single spiral coil having free ends.

10. A bearing comprising a spiral coil spring providing a smooth cylindric wearing surface, having the convolutions thereof formed tight together, whereby said convolutions engage each other continuously along a spiral line, an element having a wearing contact with said surface, a device having movement in the direction of the axis of said bearing, for forcibly moving the said spring bodily endwise, by exerting pressure on one end thereof, adapted for keeping the said convolutions in engagement with each other, and means whereby said endwise movement changes the diameter of the spring, the said spring having a spiral groove for engagement with an element of said means, and said means including a member of fixed form and length for exerting a wedging action when the said spring is moved endwise.

11. A bearing comprising a spiral coil spring providing a smooth cylindric wearing surface, having the convolutions thereof formed tight together, whereby said convolutions engage each other continuously along a spiral line, means engaging said surface, having motion thereon about the axis of the bearing, a device having movement in the direction of the axis of said bearing, for forcibly moving the said spring bodily endwise, by exerting pressure on one end thereof, adapted for keeping the said convolutions in engagement with each other, whereby each convolution pushes the next one ahead by direct lateral contact therewith and means whereby said endwise movement changes the diameter of the spring, the said spring having a spiral groove for said last mentioned means, the opposite ends of said spring being of the same internal and external diameter.

12. A bearing comprising a spiral coil spring providing a smooth cylindric wearing surface, having the convolutions thereof formed tight together, whereby said convolutions engage each other continuously along a spiral line, means engaging said surface, having motion thereon about the axis of the bearing, a device having movement in the direction of the axis of said bearing, for forcibly moving the said spring bodily endwise, by exerting pressure on one end thereof, serving thus to keep the said convolutions compressed together, whereby each convolution pushes the next one ahead by direct lateral contact therewith, and means whereby said endwise movement changes the diameter of the spring, the said spring having a spiral groove for said last mentioned means, and said spring consisting of a single spiral coil having free ends, the opposite ends of said spring being of the same internal and external diameter.

13. A bearing comprising a spiral coil spring providing a smooth cylindric wearing surface having the convolutions thereof formed tight together, whereby said convolutions engage each other continuously along a spiral line, an element having a wearing contact with said surface, a device having movement in the direction of the axis of said bearing, for forcibly moving the said spring bodily endwise, by exerting pressure on one end thereof, serving thus to keep the said convolutions compressed together, and means whereby said endwise movement changes the diameter of the spring, the said spring having a spiral groove for engagement with an element of said means, and said means including a member of fixed form and length for exerting a wedging action when the said spring is moved endwise, the opposite ends of said spring being of the same internal and external diameter.

14. An adjustable bearing comprising a helical spring having the convolutions thereof formed with their edges tight together, to provide a practically continuous and an unbroken wearing surface, parallel rollers engaging said surface, and mechanism for changing the diameter of said spring, to take up wear, including an adjustable element for exerting an endwise thrust on said spring, whereby each convolution pushes ahead on the next one by direct lateral contact therewith, serving to hold the same in the adjusted position thereof, and a member coöperating with said element to cause the convolutions of the spring to slide on each other.

15. An adjustable bearing comprising a helical spring having the convolutions thereof formed with their edges tight together, to provide a practically continuous and an unbroken wearing surface, means engaging said surface and traveling thereon, and mechanism for changing the diameter of said spring, to take up wear, causing each convolution to push ahead on the next one by direct lateral contact therewith, and whereby the spring sustains an endwise thrust during and after adjustment thereof, including an element for causing the convolutions of the spring to slide on each other during the adjustment thereof.

16. An adjustable bearing comprising a helical spring having convolutions which are held tight together by the tension thereof, to provide a practically continuous and an unbroken wearing surface, means engaging said surface, having movement thereon about the axis of the bearing, and mechanism for changing the diameter of said spring, including an adjusting element for exerting a straight endwise thrust on the spring, to take up wear, operating to cause the convolutions of the spring to slide on each other, serving also to hold the spring in position against the tension thereof.

17. An adjustable bearing comprising a helical spring having convolutions which are held tight together by the tension thereof to provide a practically continuous and an unbroken wearing surface, means engaging said surface, having movement thereon about the axis of the bearing, and mechanism for changing the diameter of said spring, including an adjusting element for exerting a straight endwise thrust on the spring, to take up wear by causing the convolutions of the spring to slide on each other, including an adjustable element for pushing the spring endwise, serving also to hold the spring in position against the tension thereof.

Signed by me at Chicago, Illinois, this 2nd day of Nov., 1911.

HUBERT A. MYERS.

Witnesses:
GEO. F. SCHMIDT,
E. H. CLEGG.